United States Patent
Schulte Am Hülse

(10) Patent No.: US 6,615,249 B2
(45) Date of Patent: Sep. 2, 2003

(54) METHOD FOR COMPARING AND SYNCHRONIZING DATA FROM DIFFERENT DATA SOURCES

(76) Inventor: Regina Schulte Am Hülse, Wrangelstrasse 15, Hamburg (DE), 20253

(*) Notice: Subject to any disclaimer, the term of this patent is extended or adjusted under 35 U.S.C. 154(b) by 0 days.

(21) Appl. No.: 09/759,957

(22) Filed: Jan. 11, 2001

(65) Prior Publication Data

US 2001/0008500 A1 Jul. 19, 2001

(30) Foreign Application Priority Data

Jan. 14, 2000 (DE) .......................... 100 01 216

(51) Int. Cl.⁷ .............................. G06F 13/00
(52) U.S. Cl. .................. 709/217; 709/313; 709/328
(58) Field of Search ........................ 709/217, 219, 709/230, 246, 313, 328, 329, 321

(56) References Cited

U.S. PATENT DOCUMENTS

| | | | | |
|---|---|---|---|---|
| 4,811,325 A | * | 3/1989 | Sharples, Jr. et al. | 369/85 |
| 5,732,216 A | * | 3/1998 | Logan et al. | 709/203 |
| 5,782,692 A | * | 7/1998 | Stelovsky | 463/1 |
| 5,974,004 A | * | 10/1999 | Dockes et al. | 369/30 |
| 5,987,525 A | * | 11/1999 | Roberts et al. | 709/248 |
| 6,088,747 A | * | 7/2000 | Cotugno et al. | 710/74 |
| 6,115,534 A | * | 9/2000 | Cookson et al. | 386/94 |
| 6,201,924 B1 | * | 3/2001 | Crane et al. | 386/52 |
| 6,385,596 B1 | * | 5/2002 | Wiser et al. | 705/51 |

* cited by examiner

*Primary Examiner*—Viet D. Vu
(74) *Attorney, Agent, or Firm*—Henry M. Feiereisen

(57) ABSTRACT

A method is disclosed for applying at the location of a studio reproducible data, for example sound data, on a data carrier, wherein at least a part of the data is produced by an interpreter, for example a vocalist, at the interpreter's location and transmitted to the studio. Different interpretations can be synchronized and evaluated by the interpreter before being applied to the data carrier. Printed information can also be transmitted from the interpreter's location or another location to the studio in conjunction with the transmission of sound data.

17 Claims, 2 Drawing Sheets

METHOD FOR COMPARING AND SYNCHRONIZING DATA FROM DIFFERENT DATA SOURCES

CROSS-REFERENCES TO RELATED APPLICATIONS

This application claims the priority of German Patent Application Serial No. 100 01 216.7, filed Jan. 14, 2000, the subject matter of which is incorporated herein by reference.

BACKGROUND OF THE INVENTION

The present invention relates to a method of applying reproducible data on a data carrier. More particularly, the invention relates to a method for recording and audibly comparing data produced by several interpreters of a musical piece.

Reproducible data can be applied on a data carrier in different ways, for example, by using a tape recorder or by using a computer, wherein the data that are stored on a hard disk are transferred to a recordable CD to be burned in. It may sometimes be difficult to transfer the data to a data carrier, for example a CD, in particular when the data should be stored on the data carrier in a particular manner, for example at a certain location of the CD. The data that are transferred to the CD should also be burned at the respective selected location of the CD. This requires additional equipment which is frequently only available in a recording studio.

SUMMARY OF THE INVENTION

It is thus an object of the present invention to provide an improved method of applying data, obviating the afore-stated drawbacks.

In particular, it is an object of the present invention to provide an improved method of applying data recorded at a certain geographical location, on a data carrier at a different geographical location.

According to one aspect of the invention, data to be applied to a data carrier are electronically transported from one geographical location, where the data are generated, to another geographical location where the data are applied on the data carrier.

In this way, the data can be transported quickly, reliably and with high-quality to a geographical location where they are recorded in an expert manner onto a data carrier and burned in the data carrier. This method eliminates a loss of data. The method of the invention has several the advantages, in that not only is the transmission speed high, but the transmission quality can also be higher than with conventional methods which include, for example, mailing of recorded a data carriers, e.g., recording tapes.

Suitably, the data are merged with an already existing data set before the data are recorded on the data carrier. In this way, a quantity of data that increases in size through addition of the transmitted data, can be recorded on the data carrier.

According to another feature of the present invention, a first musical piece is converted into sound data and the transmitted sound data of a second musical piece are synchronized with the sound data of the first musical piece. This produces an processed musical piece which can be recorded on the data carrier with high quality. The sound data of the first musical piece may be created by a vocalist, with the vocalist's vocal part being synchronized with the second musical piece. This produces a rendition of the musical piece which includes a personal attribute of the performing vocalist.

According to another feature of the invention, the sound data of the first musical piece are transmitted to the vocalist, where the sound data are converted into the first musical piece. The vocal part of the vocalist is adapted to the first musical piece and converted into corresponding sound data which are then transmitted to a second data processing device for synchronization with the data of the second musical piece. With this arrangement, a musical piece can be processed independent of the local conditions. Not only can the vocalist be provided with musical pieces in which is particularly interested, but the musical pieces can also be returned to a facility with special expertise in this field. At this facility, the returned music pieces can then be applied in an expert manner on the data carrier and burned in the data carrier.

According to still another feature of the invention, the data are stored on one of three different tracks of a data carrier. With this arrangement, the other tracks can be used for different purposes, for example in connection with data that are stored on the third track. Other versions of the first musical piece can be stored on the other two tracks where the unsynchronized data are stored. This makes it possible to sequentially listen to several versions of the musical piece and to compare these version with each other.

According to another feature of the invention, an unprocessed and a processed version of the first musical piece are stored on the two other tracks. By using the data carrier this manner, three versions of the same musical piece can be compared with one another, namely the original version, a processed version and the synchronized version. By comparing these versions, it can be determined, to which extent the different versions are different from one another and if the difference is likely to be perceived favorably or unfavorably by a listener.

According to still another feature of the invention, an interfering noise representing a subdued sound of an interpreter is superimposed on the sound data of the first musical piece. This feature should prevent that the musical piece is downloaded for free.

According to another feature of the invention, a virtual tape recorder to be used by the vocalist is projected onto a projection screen, wherein the virtual tape recorder can include the conventional recording functions of a real tape recorder. This makes it easier for the vocalist to practice a musical piece which the vocalist is to perform. As with a conventional tape recorder, the vocalist can forward and rewind, play and correct if the vocalist is later not satisfied with certain passages of his vocal performance.

According to another feature of the invention, printable data can be electronically transmitted to the geographic location where the data are to be applied on the data carrier, to provide written comments concerning the data to be recorded on the data carrier. The remote data transfer can therefore also be used to transfer printable data. The printable data may be printed on the disk cover. In this way, the cover can be personalized and coordinated with the disk packaged in the cover.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
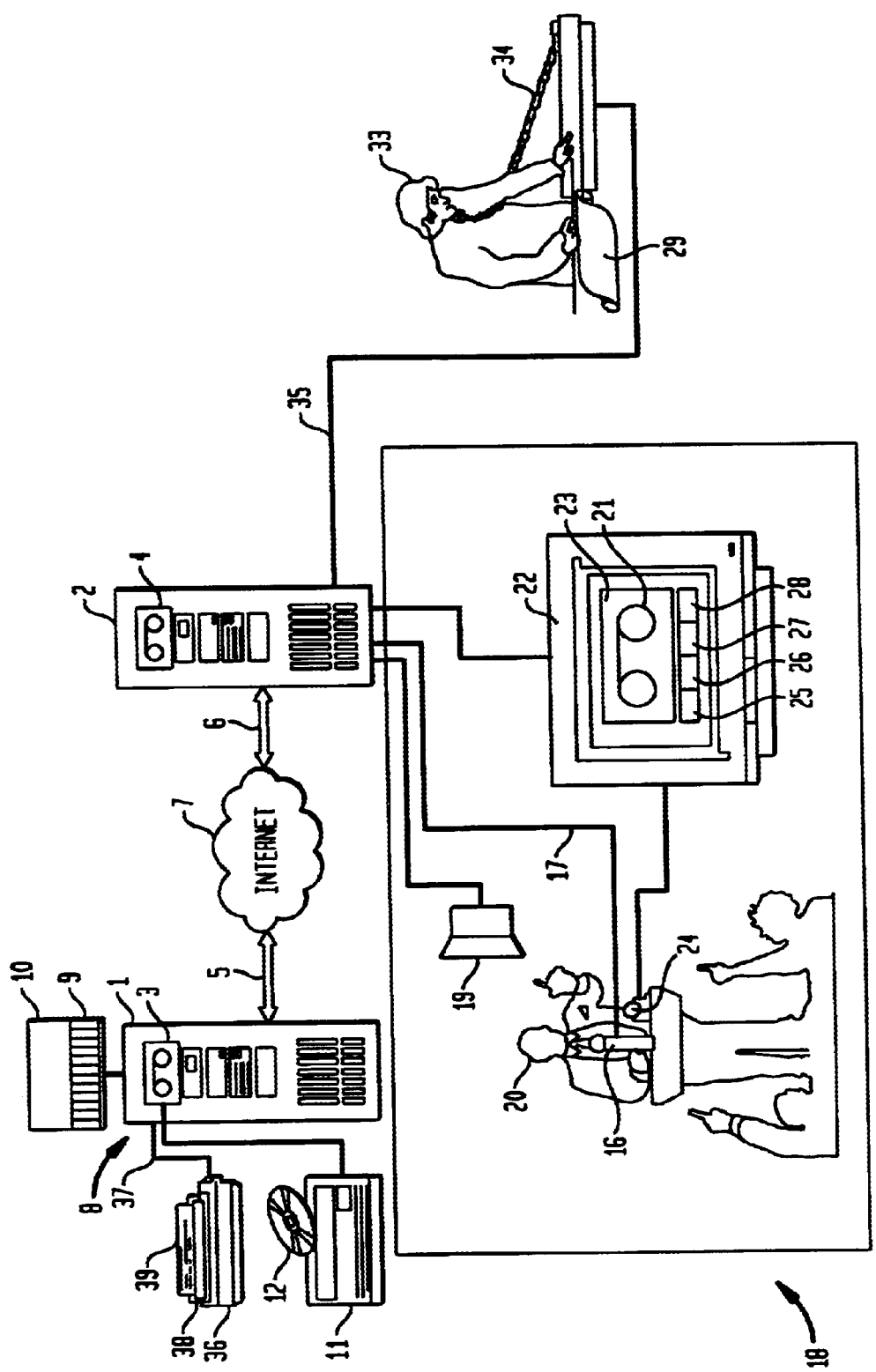
FIG. 1 shows schematically a connection between two data processing devices according to the invention.

Throughout all the Figures, same or corresponding elements are generally indicated by same reference numerals.

Referring now to the drawing, and more specifically to FIG. 1, the method of the invention is carried out by at least two data processing devices 1, 2 wherein each of the data processing devices 1, 2 includes a drive 3, 4. Each of the two data processing devices 1, 2 has an access 5, 6 to the Internet 7. The data processing device 1 is part of a studio 8 that has a collection 10 of musical pieces stored on data carriers 9 and has the intellectual property rights to distribute these musical piece s.

Figure 2:
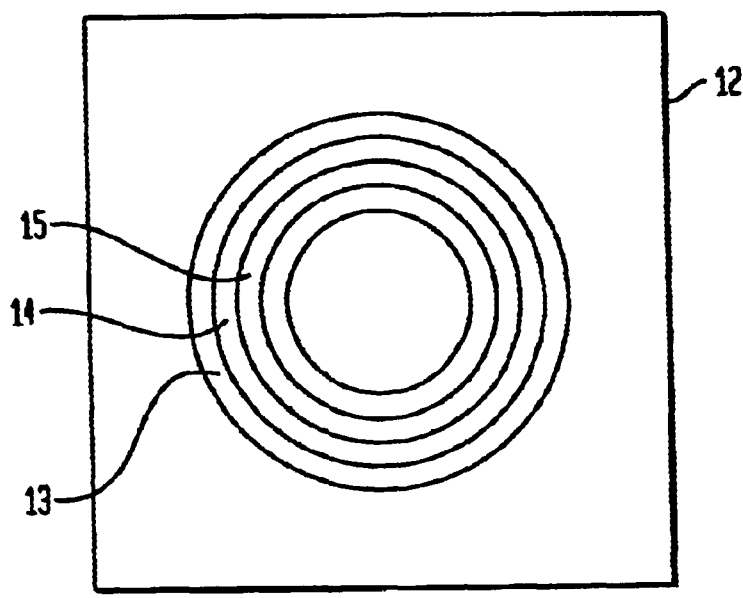
FIG. 2 shows schematically a top view of a data carrier.

In addition, the studio 8 has a burn device 11 adapted to burn data carriers 12 to which the data have been transmitted. As also seen in FIG. 2, the exemplary data carriers 12 can store data on one or more tracks 13, 14, 15, with the data being burned in the data carriers 12 in the burn device 11.

The data processing device 2 belongs to a user 20 who supplies sound data to the data processing device 2, for example, via a microphone 16 that is connected to the data processing device 2 by a transmission line 17. The user 20 may be interested a musical piece that can be accessed via the Internet 7. The user can download the musical piece from the Internet 7 using the data processing device 2 and play the musical piece in a studio 18 by using a loudspeaker 19.

The user 20 interprets this musical piece which may include a vocal part, by singing the vocal part of the musical piece in the microphone 16. The user can train his voice by recording a song with a virtual tape recorder 21 and check the result on a display screen 22. The virtual tape recorder 21 includes a tape 23 that can be operated by a switch 24, much like an actual tape recorder, including recording functions 25, playback functions 26, erasing functions 27, run and stop functions 28. In the studio 18, the user 20 can sing into the microphone 16 and either simultaneously or a later time retrieve and check his vocal performance by listening to the reproduction in the loudspeaker 19. If the vocalist feels that his vocal performance needs improvement, he can search on the tape recorder 21 for the location on the tape 21 where his performance was unsatisfactory and repeat that portion of the song. He is hereby guided by the version of the musical piece retrieved from the data processing device 2. The vocalist can either agree with the quality of the recording or can attempt to give the musical piece a more personal attribute.

If the vocalist feels that the quality of his vocal performance is good and is therefore ready to be recorded on a data carrier 12, then the user 20 connects the data processing device 2 via the Internet 7 with the data processing device 1 of the studio 8 and transmits the data sets to the studio 8. The studio 8 synchronizes the vocal piece performed by the user 20 and received from the Internet 7 with the corresponding musical piece existing in the data processing device 1 and records the synchronized musical piece on a track, for example track 15, of the data carrier 12. Additional interpretations of the musical piece can be recorded on other tracks, such as the exemplary illustrated tracks 13 and 14 (FIG. 2); for example, a version with the original interpreter may be recorded on tract 13 and rendition of the musical piece by another interpreter may be recorded on tract 14.

The data carrier 12 recorded in this matter is then placed into the burn device 11 and burned. The data carrier 12 can then be sent, for example, to the user 20 who can decide about the further use of the burned data carrier, for example, by sending the data carrier to friends or acquaintances as a gift. It will be understood that the synchronized musical piece may be recorded, for example temporarily, on the drive 3 before being burned in the data carrier 12. To prevent the unauthorized use of the transmitted musical piece without the vocal part, the original vocal part is not completely removed from the musical piece, but remains in the musical piece as a background melody. This arrangement prevents an unauthorized use of the respective musical piece. In addition, the data carrier 12 can also provided with a copy protection which prevents unauthorized retrieval and copying of the contents of the data carrier 12. Instead of transmitting the data via the Internet 7 by email, other transmission means can be selected, for example by using a special program written for such purpose. Such program can be used to exchange data directly between the two data processing devices 1, 2, for example via telephone lines.

Instead of a vocal part which the user 20 applies to the data carrier 12 by singing into the microphone 16, other sound data can also be combined with the data transmitted from the data processing device 1 of the studio 8. For example, the user 20 could combine an instrument part with the musical part retrieved from the data processing device 1. The user 20 may have created and interpreted this instrument part himself; alternatively, the user 20 may have selected this instrument part from another data carrier for combination with the music piece retrieved from the data processing device 1.

However, the music piece to be interpreted by the user 20 need not be transmitted from the data processing device 1. The user 20 may have selected this piece in a different manner and inputted the piece into the data processing device 2 for subsequent combination with selected sound data.

Instead of transferring the interpreted music piece to the data carrier 12, the interpreted music piece may also be inputted into a server (not shown), so that interested parties can then download the combined musical piece from the server.

Instead of the exemplary three tracks 13, 14, 15, a different number of tracks can be placed on the data carrier 12. On each of the tracks 13, 14, 15, the original music piece can then be recorded in a format that is different from the interpretations recorded on the other tracks.

The data carriers 12 produced in this matter can be made available as a part of audio or TV programs to an audience of casual or expert listeners with the objective that the audience names the best interpretation. This can serve as a training exercise for the audience to develop an appreciation for the different musical interpretations. It may be possible to have competitions for the best, most humorous or most original interpreters.

Figure 3:
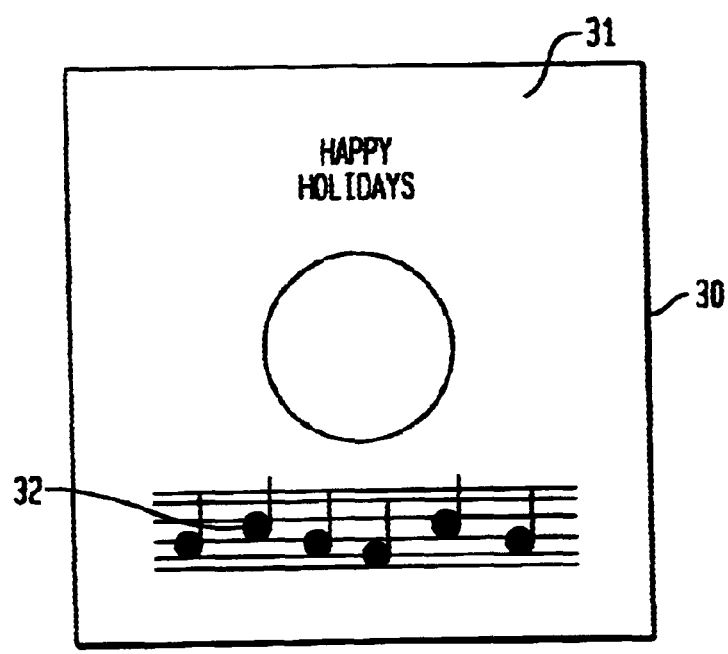
FIG. 3 shows schematically a top view of a cover.

Not only sound data, but also printable data can be transmitted to the studio 8 by remote transmission. For example, as shown in FIG. 3, a sheet of paper 29 such as a cover 30 for a data carrier 12, may have text or a script 31 or a drawing 32 supplied by a user 33 imprinted thereon. The printed paper 29 or cover 30 can also be used to provide comments about the musical piece that is recorded on the data carrier 12. The printed paper 29 or cover 30 can be distributed together with the data carrier 12.

Referring now back to FIG. 1, the printed paper 29 or cover 30 can be inserted in a scanner 34 to scan the text or script 31 and/or the drawings 32 for conversion into data.

These data are inputted into the data processing device 2 via a transmission line 35 which connects the scanner 34 with the data processing device 2. The transmission lines 17, 35 can be combined, for example, in a bus.

As discussed above, the data can be transmitted from the data processing device 2 to the data processing device 1 via the Internet 7. The data processing device 1 may be connected to a printer 36 via a printer line 37. The cover 39 to be printed can be inserted into a respective feed slot 38 located on the printer 36. After the printer 36 is initialized by the data processing device 1, the cover 39 is pulled into the printer 36 which then prints the text or script 31 and/or the drawings 32.

While the invention has been illustrated and described as embodied in a method of applying reproducible data on a data carrier, it is not intended to be limited to the details shown since various modifications and structural changes may be made without departing in any way from the spirit of the present invention.

What is claimed as new and desired to be protected by Letters Patent is set forth in the appended claims:

1. A method for combining and synchronizing data on a data carrier, comprising the steps of:

generating a data set on a first data processing device;

transmitting the generated data set electronically from the first data processing device to a second data processing device;

combining and synchronizing in the second data processing device an existing data set with the transmitted data;

transmitting the combined and synchronized data from the second data processing device to the first data processing device, recording the data in a first storage device of the first data processing device located at a first location, transmitting the data via a remote data transmission device to the second data processing device located at a second location, wherein the data transmitted to the second data processing device are in the form of sound data, and wherein the transmitted sound data are synchronized with sound data that already exist at the second data processing device, recording the transmitted data on the data carrier at the second location, merging the data with an existing data set before the data are recorded on the data carrier at the second location, transforming a first musical piece is into sound data and synchronizing the transmitted sound data derived from a second musical piece with the sound data of the first musical piece, wherein the sound data of the first musical piece are a vocal part produced by a vocalist, with the vocal part being synchronized with the second musical piece, having the vocalist repeat the vocal part for the purpose of practice, before the song is converted into data and synchronized with a data of the second musical piece, and projecting for the vocalist a virtual tape recorder onto a projection screen, wherein the virtual tape recorder includes recording functions selected from the group consisting of forward and rewind, play and record, whereby the transmitted combined and synchronized data is accessible from the first data processing device via the Internet.

2. The method of claim 1, wherein the first data processing device is associated with a user location.

3. The method of claim 1, wherein the second data processing device is associated with a studio.

4. The method of claim 1, wherein the generated data set is transmitted from the first data processing device to the second data processing device via email.

5. The method of claim 1, wherein at the time the sound data of the equal part are recorded, the sound data of the vocal part are referenced to the sound data of the first musical piece.

6. The method of claim 5, wherein the sound data of the first musical piece are transmitted to the vocalist located at the first data processing device for converting the sound data into the first musical piece, wherein the vocal part performed by the vocalist is matched to the first musical piece and translated into respective sound data, with the translated sound data for the purpose of synchronization being sent together with the data of the second musical piece to the second data processing device.

7. The method of claim 1, wherein the data of the first musical piece are synchronized with a data of the second musical piece before being burned in the data carrier.

8. The method of claim 1, wherein the data of the first musical piece that are synchronized with the data of the second musical piece are stored in a server having general access.

9. The method of claim 1, wherein the data are stored on one of a plurality of different tracks of the data carrier.

10. The method of claim 9, wherein a different version of the first musical piece is stored on a track which is different from the track where the data are stored.

11. The method of claim 9, wherein on the different track an unprocessed version of the first musical piece is stored, whereas a processed version of the first musical piece is stored on another track that is different from both the track where the unprocessed version is stored and the track where the data are stored.

12. The method of claim 6, wherein an interference sound is superimposed on the sound data of the first musical piece during transmission to the vocalist.

13. The method of claim 12, wherein the superimposed interference sound is a muffled sound of an interpreter portraying a background music.

14. The method of claim 1, wherein the data carrier is provided with a copy protection.

15. The method of claim 1, and further comprising the step of electronically transmitting printable data to the second location to provide written comments of the data to be recorded on the data carrier.

16. The method of claim 15, wherein the printable data are transmitted in the form of an artistic design.

17. The method of claim 15, wherein the printable data are printed on a cover of the data carrier.

* * * * *